US012598630B2

(12) United States Patent
Lin

(10) Patent No.: US 12,598,630 B2
(45) Date of Patent: Apr. 7, 2026

(54) USER EQUIPMENT AND RESOURCE SELECTION METHOD IN SIDELINK COMMUNICATION

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 399 days.

(21) Appl. No.: 18/081,903

(22) Filed: Dec. 15, 2022

(65) Prior Publication Data

US 2023/0118247 A1 Apr. 20, 2023

Related U.S. Application Data

(63) Continuation of application No. PCT/CN2021/110266, filed on Aug. 3, 2021.

(Continued)

(51) Int. Cl.
*H04W 72/40* (2023.01)
*H04W 72/02* (2009.01)
(Continued)

(52) U.S. Cl.
CPC ........... *H04W 72/40* (2023.01); *H04W 72/02* (2013.01); *H04W 72/044* (2013.01); *H04W 72/25* (2023.01)

(58) Field of Classification Search
CPC ..... H04W 72/40; H04W 72/25; H04W 72/02; H04W 72/044
See application file for complete search history.

(56) References Cited

U.S. PATENT DOCUMENTS

2020/0229171 A1 7/2020 Khoryaev et al.
2020/0260496 A1* 8/2020 Jin ........................ H04W 72/23
(Continued)

FOREIGN PATENT DOCUMENTS

CN 109478991 A 3/2019
CN 110958586 A 4/2020
(Continued)

OTHER PUBLICATIONS

ZTE, "Discussion on conflicts between PC5 and Uu", R1-1712917, 3GPP TSG RAN WG1 Meeting #90 Prague, Czech Republic, Aug. 21-25, 2017.

(Continued)

*Primary Examiner* — Won Tae C Kim
(74) *Attorney, Agent, or Firm* — BAYES PLLC

(57) ABSTRACT

A user equipment (UE) and a resource selection method in sidelink communication are provided. The resource selection method by a first UE includes requesting a second UE to provide a set of resources by transmitting, to the second UE, a UE assistance information (UEAI) or a scheduling request/buffer status report (SR/BSR) information, receiving the set of resources from the second UE, and selecting or avoiding selecting one or more resources from the set resources for sidelink transmission. This can solve issues in the prior art, avoid transmission collisions with one or more hidden UEs, avoid a half-duplex issue for UEs belong to a same group, save a transmitter UE processing power, provide a good communication performance, and/or provide high reliability.

14 Claims, 3 Drawing Sheets

Related U.S. Application Data

(60) Provisional application No. 63/060,305, filed on Aug. 3, 2020.

(51) Int. Cl.
H04W 72/044 (2023.01)
H04W 72/25 (2023.01)

(56) References Cited

U.S. PATENT DOCUMENTS

| | | | | | |
|---|---|---|---|---|---|
| 2021/0352628 A1* | 11/2021 | Lee | | | H04W 76/36 |
| 2022/0408285 A1* | 12/2022 | Hong | | | H04L 27/26025 |
| 2023/0171792 A1* | 6/2023 | Sun | | | H04W 72/02 |
| | | | | | 370/329 |
| 2023/0276472 A1* | 8/2023 | Hu | | | H04W 72/02 |
| | | | | | 370/230 |

FOREIGN PATENT DOCUMENTS

| | | |
|---|---|---|
| CN | 111294175 A | 6/2020 |
| WO | 2018009293 A1 | 1/2018 |
| WO | 2018204131 A1 | 11/2018 |
| WO | 2020092931 A1 | 5/2020 |
| WO | 2020146847 A2 | 7/2020 |

OTHER PUBLICATIONS

International Search Report issued in International application No. PCT/CN2021/110266, mailed Nov. 3, 2021.
Written Opinion of the International Searching Authority issued in International application No. PCT/CN2021/110266, mailed Nov. 3, 2021.

LG Electronics, "WID revision: NR sidelink enhancement", RP-201385, 3GPP TSG RAN Meeting #88e Electronic Meeting, Jun. 29-Jul. 3, 2020.
3GPP TS 38.214 V17.0.0 (Dec. 2021); Technical Specification Group Radio Access Network; NR; Physical layer procedures for data (Release 17).
3GPP TS 38.321 V17.0.0 (Mar. 2022); Technical Specification Group Radio Access Network; NR; Medium Access Control (MAC) protocol specification (Release 17).
Priority Review issued in corresponding Chinese application No. 202310282601.5, mailed Jun. 28, 2024.
First Office Action issued in corresponding Chinese application No. 202310282601.5, mailed Jul. 4, 2024.
Notice of Allowance issued in corresponding European application No. 21853942.7, mailed Aug. 1, 2024.
Second Examination Opinion Notice issued in corresponding Chinese Application No. 202310282601.5, dated Sep. 25, 2024, 12 pages.
Notice of Grant of Invention Patent Right issued in corresponding Chinese Application No. 202310282601.5, date Nov. 29, 2024, 6 pages.
Extended European Search Report issued in corresponding European application No. 21853942.7, mailed Oct. 23, 2023.
Source: LG Electronics; Title: Discussion on sidelink resource allocation mechanism 3GPP TSG RAN WG1 Meeting #94bis R1-1810283 Chengdu, China, Oct. 8-12, 2018.
Source: Intel Corporation; Title: Summary for NR-V2X AI-7.2.4. 1.4 Resource Allocation Mechanism 3GPP TSG RAN WG1 Meeting #95 R1-1813908 Spokane, USA, Nov. 12-16, 2018.
Source: LG Electronics; Title: Discussion on resource allocation for Mode 2 3GPP TSG RAN WG1 #98 R1-1908902 Prague, CZ, Aug. 26-30, 2019.
Source: OPPO; Title: Inter-UE coordination in mode 2 of NR sidelink 3GPP TSG RAN WG1 #103-e R1-2009319 e-Meeting, Oct. 26-Nov. 13, 2020.

* cited by examiner

30

610

612 — Requesting a second UE to provide a set of resources by transmitting, to the second UE, a UE assistance information (UEAI) or a scheduling request/buffer status report (SR/BSR) information 614 — Receiving the set of resources from the second UE 616 — Selecting or avoiding selecting one or more resources from the set resources for sidelink transmission

USER EQUIPMENT AND RESOURCE SELECTION METHOD IN SIDELINK COMMUNICATION

CROSS-REFERENCE TO RELATED APPLICATIONS

This application is a continuation of International Application No. PCT/CN2021/110266, filed Aug. 3, 2021, which claims the benefit of priority to U.S. Provisional Patent Application No. 63/060,305, filed Aug. 3, 2020, the contents of which are hereby incorporated by reference in their entireties.

TECHNICAL FIELD

The present disclosure relates to the field of communication systems, and more particularly, to a user equipment (UE) and a resource selection method in sidelink communication, which can provide a good communication performance and/or provide high reliability.

BACKGROUND

For developed autonomous resource selection schemes, a transmitter (Tx) user equipment (UE) does not take into account of channel environment surrounding its target receiver UE(s) (Rx UE). The Tx UE tries to avoid selecting resources that have been announced by other UEs, due to a hidden node issue, it is not aware of any and therefore cannot guarantee a collision-free reception at the receiver side (Rx UE) from using the selected resource.

Therefore, there is a need for a user equipment (UE) and a sidelink resource exclusion method, which can solve issues in the prior art, avoid transmission collisions with one or more hidden UEs, avoid a half-duplex issue for UEs belong to a same group, save a transmitter UE processing power, provide a good communication performance, and/or provide high reliability.

SUMMARY

An object of the present disclosure is to propose a user equipment (UE) and a resource selection method in sidelink communication, which can solve issues in the prior art, avoid transmission collisions with one or more hidden UEs, avoid a half-duplex issue for UEs belong to a same group, save a transmitter UE processing power, provide a good communication performance, and/or provide high reliability.

In a first aspect of the present disclosure, a first user equipment (UE) includes a memory, a transceiver, and a processor coupled to the memory and the transceiver. The processor is configured to request a second UE to provide a set of resources by controlling the transceiver to transmit, to the second UE, a UE assistance information (UEAI) or a scheduling request/buffer status report (SR/BSR) information, control the transceiver to receive the set of resources from the second UE, and select or avoid selecting one or more resources from the set resources for sidelink transmission.

In a second aspect of the present disclosure, a resource selection method in sidelink communication by a first user equipment (UE) includes requesting a second UE to provide a set of resources by transmitting, to the second UE, a UE assistance information (UEAI) or a scheduling request/buffer status report (SR/BSR) information, receiving the set of resources from the second UE, and selecting or avoiding selecting one or more resources from the set resources for sidelink transmission.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Figure 1:
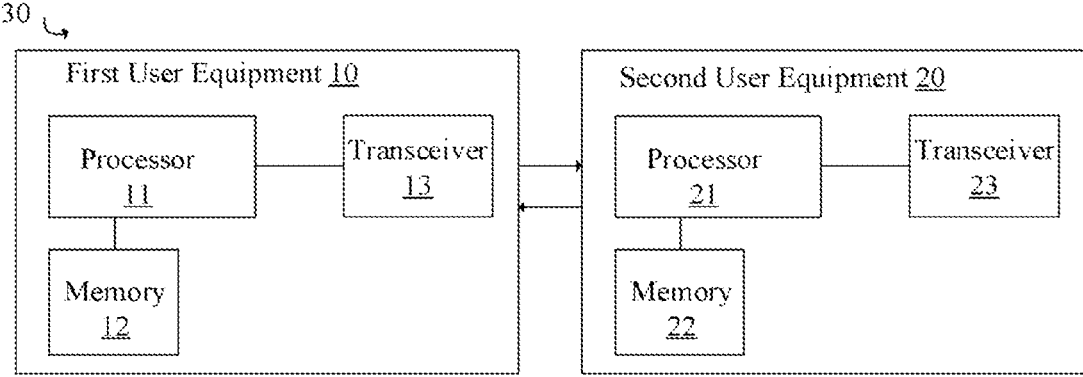
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In the development of a new sidelink (SL) transmission system, based on the latest 5th generation-new radio (5G-NR) mobile technology, for direct communication between devices/user equipments (UEs) in proximity, a SL resource allocation scheme, based on a transmitter UE (Tx UE) autonomous selection of resource entirely on its own with minimum (pre-)configurations and sometimes without any assistance from the mobile network (also commonly known as mode 2 resource selection) is introduced in 3rd generation partnership project (3GPP) Release 16.

Furthermore, when a sidelink resource allocation scheme is entirely based on Tx UE self-selection without any knowledge or taking other member UE's resource selection/reservation decision into consideration in a SL unicast and groupcast communication, it is very likely that the selected resource and SL transmission will encounter a half-duplex issue, where member UEs belong to the same group having time overlapping SL resource selection/transmission would not be able to hear each other's messages. To this end, 3GPP approved a new Release 17 work item (RP-201385) on sidelink enhancement to study mechanisms for inter-UE coordination as part of resource allocation enhancement for enhanced reliability and reduced latency. Further, it is based on a general framework where "a set of resources is determined at a UE-A. This set is sent to a UE-B in mode 2, and the UE-B takes this into account in the resource selection for its own transmission." With this, even though the general resource allocation enhancement framework has been laid out, it is yet to resolve and answer the following issues and questions.

When there is no sidelink data packet to transmit from the UE-B, the UE-A would not need to determine and transmit, to the UE-B, a set of resource from which the UE-B selects resource for transmission. Furthermore, even if the UE-B does have data packet to transmit over the sidelink, the UE-A may not be the target Rx UE and the exact timing and the range of time from which the UE-B needs to transmit its data packet cannot be predicted by the UE-A. Moreover, according to the existing mode 2 resource selection procedure described in 3GPP technical specifications (38.214 and 38.321), many technical parameters relating to sidelink resource pool and attributes relating to the sidelink data transport block (TB) to be transmitted over the sidelink are needed for resource selection at the Tx UE. But in this case, a set of resources may be first determined at the UE-A before transmitting to the UE-B for final selection and transmission. Therefore, the above problems and the list of questions below can be resolved. The list of questions includes how the whole resource selection process is triggered, how the set of resources can be determined at the UE-A, and how the UE-B can take this into account in the resource selection.

In some embodiments, for the present disclosed methods of resource selection assisted by a target receiver UE, a cluster header, or a centralized controller, it aims to resolve the hidden node issue in the existing mode 2 resource allocation scheme, the described issues in the general resource selection enhancement framework, and to coordinate sidelink resource allocation among UEs to avoid half-duplex issue (hear-ability problem) by adopting a trigger then response strategy. In some embodiments, other benefits of adopting the proposed assisted resource selection methods include minimal signal processing at the Tx UE and thus power saving/reduced battery consumption.

FIG. 1 illustrates that, in some embodiments, one or more first user equipments (UEs) 10 and one or more second user equipments (UEs) 20 of communication in a communication network system 30 according to an embodiment of the present disclosure are provided. The communication network system 30 includes one or more UEs 10 and one or more second UE 20. The first UE 10 may include a memory 12, a transceiver 13, and a processor 11 coupled to the memory 12 and the transceiver 13. The second UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond.

In some embodiments, the first UE 10 may be a sidelink packet transport block (TB) transmission UE (Tx-UE). The second UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
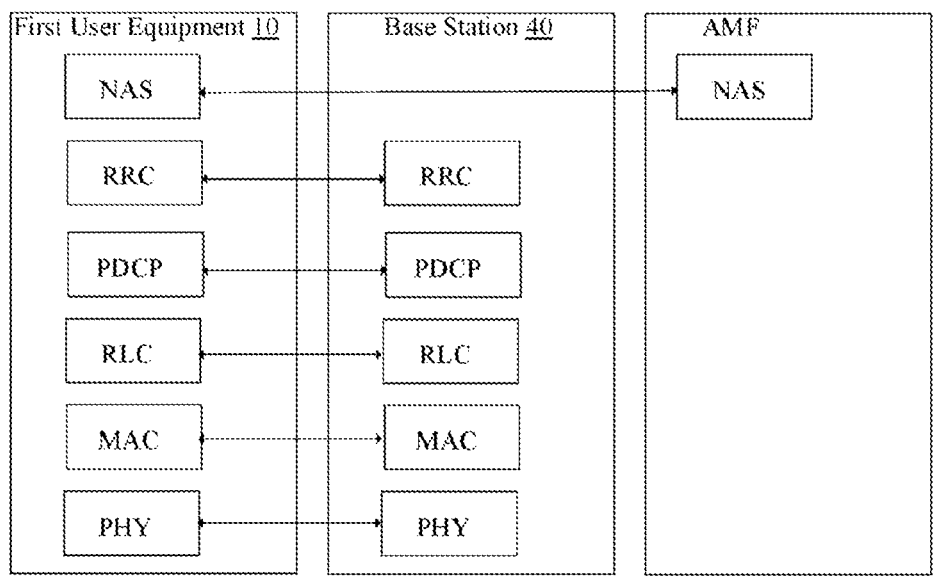
FIG. 2 is a schematic diagram illustrating an example user plane protocol stack according to an embodiment of the present disclosure.

FIG. 2 illustrates an example user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a first UE 10 and a base station 40 (such as gNB) on a network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
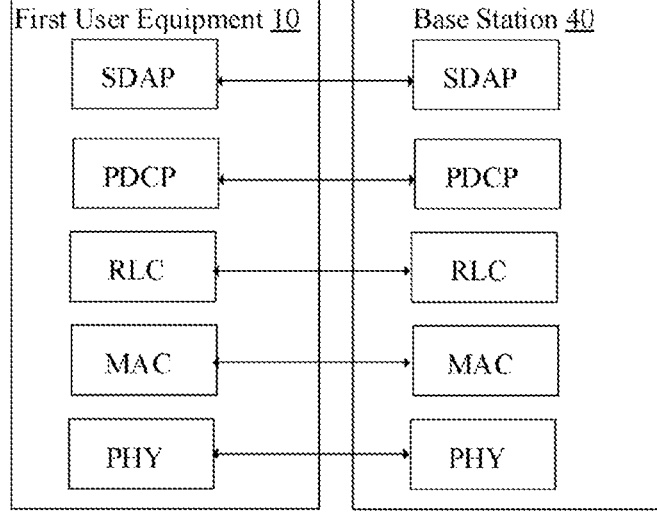
FIG. 3 is a schematic diagram illustrating an example control plane protocol stack according to an embodiment of the present disclosure.

FIG. 3 illustrates an example control plane protocol stack according to an embodiment of the present disclosure. FIG. 2 illustrates that, in some embodiments, in the control plane protocol stack where PDCP, RLC, and MAC sublayers and PHY layer may be terminated in a first UE 10 and a base station 40 (such as gNB) on a network side and perform service and functions described above. In an example, RRC used to control a radio resource between the UE and a base station (such as a gNB). In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the processor 11 is configured to request a second UE to provide a set of resources by controlling the transceiver to transmit, to the second UE, a UE assistance information (UEAI) or a scheduling request/buffer status report (SR/BSR) information, control the transceiver to receive the set of resources from the second UE, and select or avoid selecting one or more resources from the set resources for sidelink transmission. This can solve issues in the prior art, avoid transmission collisions with one or more hidden UEs, avoid a half-duplex issue for UEs belong to a same group, save a transmitter UE processing power, provide a good communication performance, and/or provide high reliability.

Figure 4:
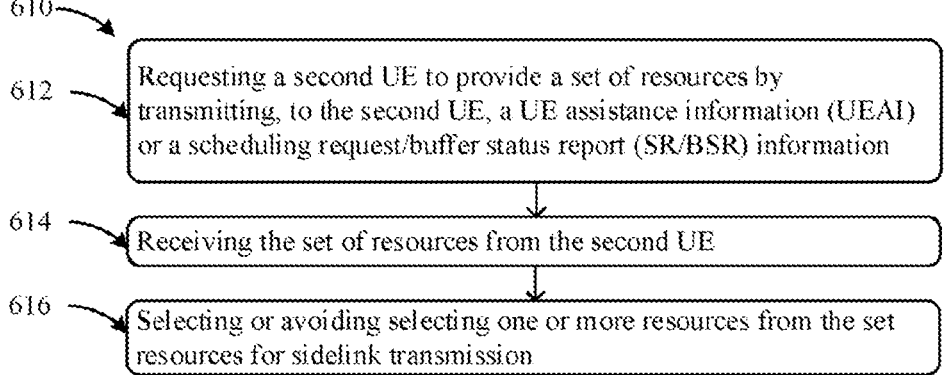
FIG. 4 is a flowchart illustrating a resource selection method in sidelink communication by a user equipment (UE) according to an embodiment of the present disclosure.

FIG. 4 illustrates a resource selection method 610 in sidelink communication by a user equipment (UE) according to an embodiment of the present disclosure. In some embodiments, the method 610 includes: a block 612, requesting a second UE to provide a set of resources by transmitting, to the second UE, a UE assistance information (UEAI) or a scheduling request/buffer status report (SR/BSR) information, a block 614, receiving the set of resources from the second UE, and a block 616, selecting or avoiding selecting one or more resources from the set resources for sidelink transmission. This can solve issues in the prior art, avoid transmission collisions with one or more hidden UEs, avoid a half-duplex issue for UEs belong to a same group, save a transmitter UE processing power, provide a good communication performance, and/or provide high reliability.

In some embodiments, the UEAI or the SR/BSR information is transmitted periodically by the first UE, triggered upon sidelink data arrival from a UE upper layer, and/or triggered by the second UE. In some embodiments, the UEAI or the SR/BSR information is provided in a radio resource control (RRC) message or an information element (IE). In some embodiments, the RRC message comprises a PC5-RRC message. In some embodiments, the UEAI comprises one or more of the followings: priority, a latency or remaining packet delay budget (PDB), periodicity, a resource selection window length or a start and/or finish time, a sidelink resource size, a number of transmission resources, a resource pool index or identifier, and/or whether a resource pool is network configured or pre-configured. In some embodiments, the SR/BSR information comprises one or more of the followings: a buffer or transport block size, a modulation and coding scheme (MCS), a number of transmission layers, priority, a latency or remaining PDB, periodicity, a resource selection window length or a start and/or finish time, a number of transmission resources, an RP index or identifier, and whether a resource pool is network configured or pre-configured.

In some embodiments, the method further comprises triggering the second UE to perform monitoring on a sidelink resource pool and exclude resources within a resource selection window. In some embodiments, the set of resources comprises a remaining candidate resource set or excluded resources from the second UE. In some embodiments, a selection of the remaining candidate resource set or the excluded resources at the second UE is based on one or more of the followings: a ranking of measured reference signal received power (RSRP) and/or an RSRP threshold used for the remaining candidate resource set or the excluded resources, resources that are early in time, and/or transmission timing of the second UE and/or other UEs. In some embodiments, an indication of the set of resources is based on a sidelink resource index or a bitmap of sidelink resources within the resource selection window. In some embodiments, the sidelink resource index or the bitmap of sidelink resources is arranged from a frequency direction and a time direction. In some embodiments, selecting the one or more resources from the set resources for sidelink transmission is based on one or more of the followings: a number of sidelink transmissions, resources that are early in time, and/or timing of other sidelink transmission.

In some embodiments, the method further comprises receiving, from the second UE, a set of resource timing slots in which the first UE performs or does not perform the sidelink transmission. In some embodiments, the set of resource timing slots is counted in physical or logical slots. In some embodiments, if the set of resource timing slots is not associated with a sidelink resource pool, the set of resource timing slots is counted in the physical slots. In some embodiments, if the set of resource timing slots is associated with a sidelink resource pool, the set of resource timing slots is counted in the logical slots. In some embodiments, the set of resource timing slots is represented using a bitmap or slot index within a new radio (NR) radio frame. In some embodiments, a starting slot within a sidelink resource pool or a slot offset is relative to a physical sidelink broadcast channel (PSBCH) slot, system frame number (SFN) 0, a slot in which the first UE receives an indication, or a timing slot indicated by the first UE. In some embodiments, the slot offset is applied by the set of resource timing slots. In some embodiments, the method further comprises performing monitoring on a sidelink resource pool and selecting or avoiding selecting resources from the set of resource timing slots indicated by the second UE.

In some embodiments, in the present disclosure of assisted selection of resources methods for the 5th generation-new radio (5G-NR) sidelink (SL) unicast and groupcast communications, a second user equipment (UE), which can be a target receiver UE (Rx UE) reports/indicates a set of potential resources or resource timing slots to assist with SL resource selection for transmission by a first UE (Tx UE). The second UE could be a target receiver UE or a local/ cluster header in a SL unicast/groupcast, or a centralized controller such as a road side unit (RSU) in vehicle-to-everything (V2X) communication, and from all of which they perform a resource coordination function to enhance SL communication reliability and reduce SL data delivery latency. And these different UEs/devices using the disclosed exemplary methods can assist in resource selection of a transmitter UE (Tx UE), to avoid transmission collisions with hidden node UE(s) by taking into account of resource reservation status and interference environment seen at the receiver UE, avoid half-duplex problem for UEs belong to a same group (unicast or groupcast), and/or save Tx UE processing power, since the operation of resource sensing and some parts of resource selection that were traditionally done by the Tx UE is now shifted to the Rx UE, cluster header, or a centralized controller.

In order to realize the above resource coordination function and to resolve the above problems, one of the following disclosed exemplary methods can be adopted for SL resource selection.

Exemplary Method 1:

In one embodiment, a set of sidelink resources reported from a second UE (e.g., a Rx UE) that can be used for immediate selection or to be excluded by the Tx UE (the first UE) during sidelink resource selection process is disclosed. In order for the Rx UE to determine the set of resources that can be used for immediate selection or to be excluded by the Tx UE, the Rx UE needs to have knowledge about the SL data transport block (TB) for which the Tx UE needs to transmit and the resource pool in which the Tx UE will perform the required SL transmission. Without this information, the Rx UE would not be able to provide a set of SL resources that are suitable for carrying the data TB (e.g., with a right resource size and timing that the Tx UE needs).

To this end, the following exemplary procedure steps are proposed.

Exemplary step 1: To trigger the Rx UE to provide the set of sidelink resources that can be used in the resource selection for SL transmission, the Tx UE first transmits a request to the Rx UE by providing UE assistance information (UEAI) or scheduling request/buffer status report (SR/ BSR). The UEAI or BSR information can be provided periodically by the first UE, event triggered upon SL data arrival from UE upper layer, and/or triggered by the second UE. Further, the UEAI or BSR information can be provided in radio resource control (RRC) message/information element (IE), wherein the RRC is PC5-RRC. In some embodiments, the UEAI includes one or more of the followings: priority, latency or remaining packet delay budget (PDB), periodicity, resource selection window length or the start and/or finish time (T1 and/or T2), SL resource size (LsubCH), number of (re)transmission resources, resource pool (RP) index or identifier, and whether the RP is network configured or pre-configured. In some embodiments, the BSR information should include one or more of the followings: buffer or transport block size, modulation and coding scheme (MCS), number of transmission layers, priority, latency or remaining packet delay budget (PDB), periodicity, resource selection window length or the start and/or finish time (T1 and/or T2), number of (re)transmission resources, resource pool index or identifier, and whether the RP is network configured or pre-configured.

Exemplary step 2: Upon receiving the request/trigger from Tx UE, Rx UE initializes a candidate resource set (SA) for a resource selection window indicated by the Tx UE, performs monitoring/sensing of slots belong to the indicated or a selected sidelink RP, and perform exclusion of sidelink resources from the set SA based on sensing results. In some embodiments, the Rx UE may determine/select the same or a different sidelink RP regardless of if the RP information is already indicated by the Tx UE. Exclusion includes resources that are reserved by SCI/PSCCH received during sensing and resources that associated with RP slots were not monitored by Rx UE (which may be due to other SL and/or UL transmissions). Exclusion includes also resources that are already reserved by the Rx UE.

Exemplary step 3: The Rx UE reports the full set or a subset of the remaining candidate resources in SA, or the set of excluded resources from Step 2 to the Tx UE. The reporting of full set of the remaining set SA is beneficial when number of resources needed for SL transmission is large (e.g., 32) and/or when the configured RP parameter× Percentage is low (e.g., 20%), such that there are very limited number of resources that can be selected from. On the other hand, when the number of resources needed for SL transmission is small and/or there are plenty of remaining candidate resources in set SA, it can be beneficial to reduce the data size to report only a subset of resources. The Rx UE selects a subset can be based on one or more of the following selection methods: Ranking of measured RSRP and/or the latest RSRP threshold used for each of the remaining candidate resources in set SA. A SL resource from the remaining candidate resource set that corresponds to a lower measured RSRP value during the sensing process may have a higher ranking, or a SL resource from the remaining candidate resource set that corresponds to higher RSRP threshold used during the resource exclusion process may have a higher ranking. Resources that are early in time (to minimize SL transmission latency), and/or transmission timing of its own and/or other UEs. The report/representation of the set of resources from the Rx UE is based on sidelink resource index or a bitmap of sidelink resources within the resource selection window or the initial candidate resource set SA (before any exclusion in Step 2). Furthermore, the resource indices or the bitmap of resources is arranged/counted from frequency direction first then time direction, or time direction first then frequency direction.

Exemplary step 4: After receiving the reported set of resources, the Tx UE selects one or more resources from the Rx UE's provided resource set for sidelink transmission based on one or more of the following selection criteria: Number of sidelink transmissions, resources that are early in time, and/or timing of other SL transmission(s).

Figure 5:
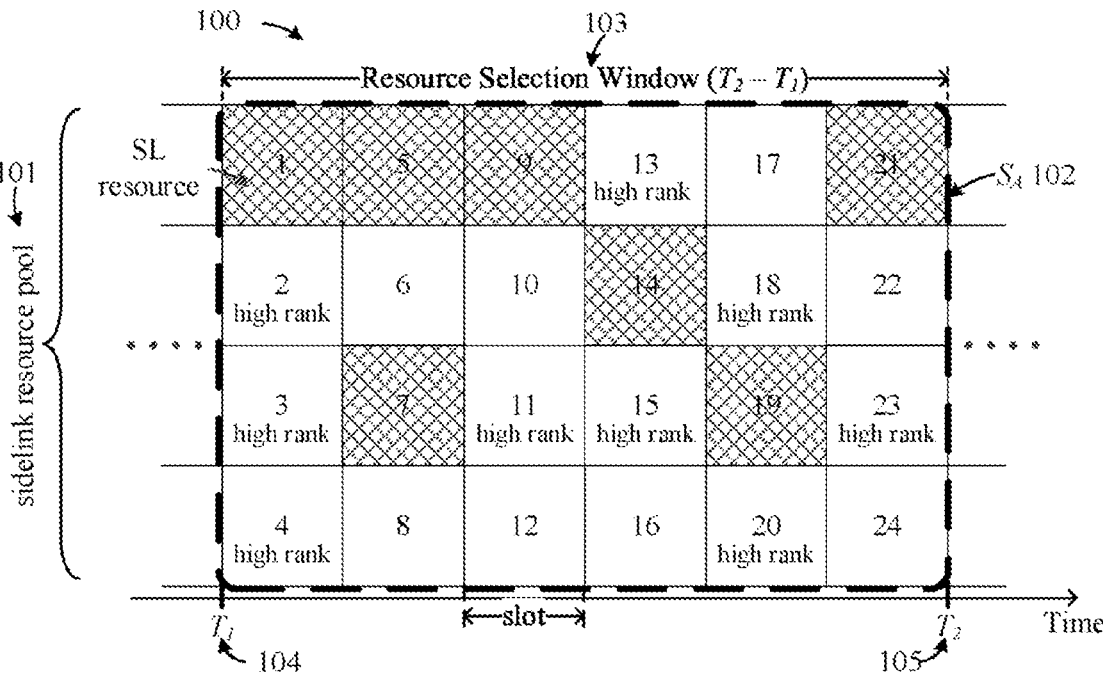
FIG. 5 is a schematic diagram illustrating an exemplary illustration of a proposed method 1 for assisted resource selection scheme according to an embodiment of the present disclosure.

FIG. 5 is a schematic diagram illustrating an exemplary illustration of a proposed method 1 for assisted resource selection scheme according to an embodiment of the present disclosure. FIG. 5 illustrates that, in some embodiments, a UE (Rx UE) determines and transmits a subset of available candidate resources to another UE (Tx UE) for selection in a SL unicast connection session. In this exemplary scenario, the Rx UE is the local cluster header for the SL unicast session. After receiving SL UEAI or BSR information provided by the Tx UE to request for a set of suitable/available resources for a specific sidelink resource pool 101, this triggers the local cluster header Rx UE to initialize a candidate resource set SA 102 within a resource selection window 103 bounded by time T1 104 and time T2 105 according to the received UEAI/BSR, and perform a sensing operation where the Rx UE monitors the slots belong to the SL RP 101 and extracts resource reservation/allocation details from all received sidelink control information (SCI) in physical sidelink control channel (PSCCH). Then based on the resource reservation details, the Rx UE excludes any SL resource from the initial candidate resource set SA 102 that are already reserved by other UEs, and its associated reference signal received power (RSRP) measurement is larger than a corresponding RSRP threshold. In this example, let's assume SL resources with indices 1, 5, 7, 9, 14, 19, and 21 are excluded. Then the resources remained in the candidate set is a full set of a remaining candidate resources in SA, which includes SL indices (2, 3, 4, 6, 8, 10, 11, 12, 13, 15, 16, 17, 18, 20, 22, 23 and 24) that can be directly reported to Tx UE for selection. However, during the resource sensing and exclusion procedure, the Rx UE detected SL resource (2, 3, 4, 11, 13, 15, 18, 20, and 23) has lower associated RSRP measurement, therefore, they may be considered as preferred/higher ranking resources for SL transmission. So, instead of reporting the full set, Rx UE reports the high ranking set, which is a subset of the remaining candidate resource set SA, to Tx UE for selection.

Exemplary Method 2: In another embodiment, a simplified method of providing from Rx UE, a set of resource timing slots that can be used or to be avoided by the Tx UE to transmit data TB over the sidelink interface is disclosed. In order for Rx UE to determine the set of resource timing slots that can be used or to be excluded by Tx UE for SL transmission, the Rx UE needs to have knowledge about the SL data transport block (TB) for which the Tx UE needs to transmit and the resource pool in which the Tx UE can perform the required SL transmission. Without this information, Rx UE would not be able to provide a set of SL resource timing slots that are suitable for carrying the data TB (e.g., with a right resource timing, number of timing slots and periodicity that Tx UE needs). Therefore, typically this disclosed method 2 is ideal for SL unicast and groupcast communications where each member UE's SL transmission timing are coordinated by a centralized controller or localized cluster header in a time domain multiplexing (TDM) manner as their transmissions need to be heard by all other member UEs. To this end, the following procedure steps are proposed.

Exemplary step 1: To trigger the Rx UE to provide the set of sidelink resources that can be used in the resource selection for SL transmission, the Tx UE first transmits a request to the Rx UE by providing UE assistance information (UEAI) or scheduling request/buffer status report (SR/BSR). The UEAI or BSR information can be provided periodically by the first UE, event triggered upon SL data arrival from UE upper layer, and/or triggered by the second UE. And the UEAI or BSR information can be provided in radio resource control (RRC) message/information element (IE), wherein the RRC is PC5-RRC. In some examples, the UEAI may include one or more of the followings: priority, latency or remaining packet delay budget (PDB), periodicity, resource selection window length or the start and/or finish time (T1 and/or T2), resource pool (RP) index or identifier, and whether the RP is network configured or pre-configured. The BSR information may include one or more of the followings: buffer or transport block size, priority, latency or remaining packet delay budget (PDB), periodicity, resource selection window length or the start and/or finish time (T1 and/or T2), resource pool index or identifier, and whether the RP is network configured or pre-configured.

Exemplary step 2: Based on the received UEAI or BSR information from Tx UE and possibly also taking into account of other UE's UEAI/BSR information, Rx UE determines and provides a set of resource timing slots in which Tx UE can or cannot perform sidelink transmission. The resource timing slots should be counted in either physical or logical slots. In some embodiments, if the set of resource timing slots is not associated with a particular sidelink RP (e.g., sidelink RP identity or index is not provided), the indicated timing slots from the second UE is counted in physical slots, which can allow the Tx UE to flexibly decide the sidelink RP it wishes to use to perform its own sidelink transmission. If the Rx UE also indicates the sidelink RP identity or index that is associated to the set of resource timing slots, the indicated set of resource timing slots is counted in logical slots. The set of resource timing slots can be represented using a bitmap or slot index within a NR radio frame. The starting slot within the SL resource pool or the slot offset from which the indicated resource timing slots should apply is relative to PSBCH, SFN #0, the slot in which the Tx UE receives the indication, or a timing slot indicated by Tx UE as part of UEAI or BSR information.

Exemplary step 3: The Tx UE performs monitoring/sensing on a sidelink resource pool and selects or avoids selecting resources from the set of resource timing slots indicated by the Rx UE.

Figure 6:
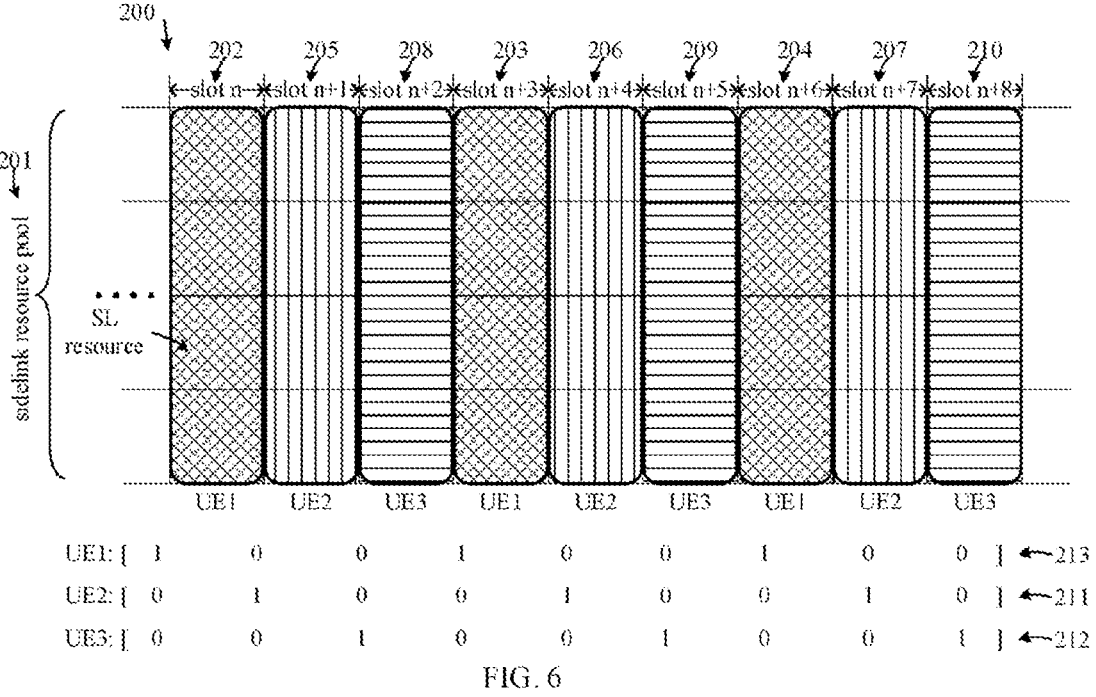
FIG. 6 is a schematic diagram illustrating an exemplary illustration of a proposed method 2 for assisted resource selection scheme according to an embodiment of the present disclosure.

FIG. 6 is a schematic diagram illustrating an exemplary illustration of a proposed method 2 for assisted resource selection scheme according to an embodiment of the present disclosure. FIG. 6 illustrates that an exemplary illustration for the proposed method of resource timing slot coordination among three UEs (namely UE1, UE2, and UE3) performing SL communication with one another over a SL resource pool 201. In one scenario, the UE1 is the centralized/designated local resource controller (e.g., a cluster header/RSU) for the 3 UEs. After receiving SL UEAI or BSR information from UE2 and UE3, the centralized resource controller UE1 determines a set of resource timing slots for all three UEs by taking into account of their and its own traffic patterns. For all three UEs, the UE1 has fairly allocated ⅓ of the resource pool slots to each UEs and the assigned timing slots alternates between the UEs as illustrated in diagram 200. That is, the UE1 has assigned itself resource timing slots n 202, n+3 203, n+6 204 and so on, assigned UE2 with resource timing slots n+1 205, n+4 206, n+7 207 and so on, and assigned UE3 with resource timing slots n+2 208, n+5 209, n+8 210 and so on in the resource pool 201. To indicate this resource timing slot assignment, it is represented as a bitmap to UE2 and UE3 as illustrated in 211 and 212, respectively. In another exemplary scenario, where the UE1 is also communicating using sidelink with another UE (UE4) in a separate sidelink session (e.g., unicast), it transmits to the UE4 a set of resource timing slots according to the assigned pattern 213 and indicates to the UE4 that these timing slots should not be used (to be avoided) for SL transmission when communicating with the UE1.

In summary, in some embodiments, in order to resolve the issue of potential transmission collisions with hidden nodes and incorrect determination at the receiver UE of sidelink resource size and transmission timing for the transmitter UE, it is proposed to adopt the following assisted resource selection, exemplary method 1. The exemplary method 1 includes the following exemplary steps. 1. A first UE triggers/requests a second UE to provide a set of resources by transmitting a UE assistance information (UEAI) or a scheduling request/buffer status report (SR/BSR) information. 2. The second UE performs monitoring/sensing on a sidelink resource pool and exclude resources within a resource selection window. 3. The second UE reports the full set or a subset of a remaining candidate resource set or the excluded resources to the first UE. 4. When a subset of the remaining candidate resources is to be sent to the first UE, the selection of the subset at the second UE is based on one or more of the followings: Ranking of measured RSRP and/or the RSRP threshold used, resources that are early in time, and/or transmission timing of its own and/or other UEs. 5. The indication of the set of resources is based on sidelink resource index or a bitmap of sidelink resources within the resource selection window. 6. The first UE selects one or more resources from the second UE's provided resource set for sidelink transmission based on one or more of the followings: Number of sidelink transmissions, resources that are early in time, and/or timing of other SL transmission(s). Further, in order to resolve the common half-duplex issue for SL groupcast and unicast (multiple UEs' transmission overlap in time and not able to receive each other's messages), it is proposed to adopt the following assisted resource selection Method 2 to coordinate transmission timings among member UEs within a same group. The exemplary method 2 includes the following exemplary steps. 1. A first UE triggers/requests a second UE to provide a set of resources by transmitting UEAI or sidelink BSR related information. 2. The second UE provides a set of resource timing slots in which the first UE should or should not perform sidelink transmission. 3. The first UE performs monitoring/sensing on a sidelink resource pool and selects or avoids selecting resources from the set of resource timing slots indicated by the second UE.

Commercial interests for some embodiments are as follows. 1. Solving issues in the prior art. 2. Avoiding transmission collisions with one or more hidden UEs. 3. Avoiding a half-duplex issue for UEs belong to a same group. 4.

Saving a transmitter UE processing power. 5. Providing good communication performance 6 Providing high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed invention and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create an end product. Some embodiments of the present disclosure relate to mobile cellular communication technology in 3GPP NR Release 17 and beyond for providing direct device-to-device (D2D) wireless communication services.

Figure 7:
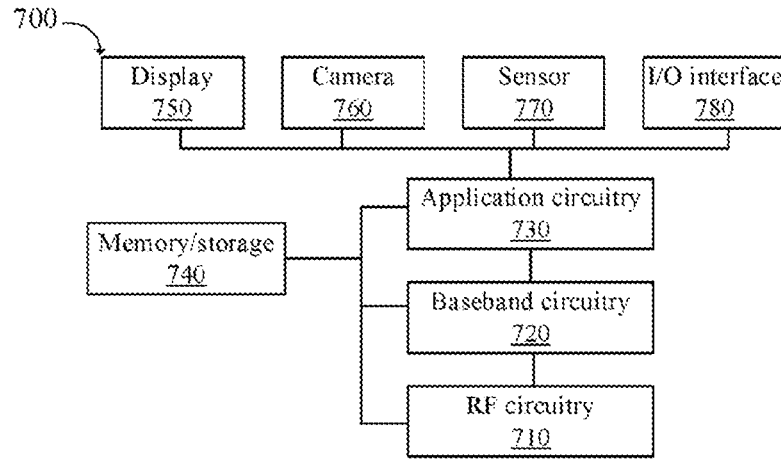
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource selection method in sidelink communication by a first user equipment (UE), comprising:

triggering a second UE to provide a set of resources by sending, to the second UE, a UE assistance information;

receiving the set of resources from the second UE; and avoiding selecting one or more resources from the set of resources for sidelink transmission, wherein the resource selection method further comprises:

triggering the second UE to perform monitoring on a sidelink resource pool and exclude resources within a resource selection window, wherein the set of resources comprises a remaining candidate resource set from the second UE, wherein the UE assistance information comprises a resource selection window start and finish time.

2. The method of claim 1, wherein the UE assistance information is sent periodically by the first UE, triggered upon sidelink data arrival from a UE upper layer, and/or triggered by the second UE.

3. The method of claim 1, wherein a selection of the remaining candidate resource set at the second UE is based on transmission timing of the second UE and/or other UEs.

4. The method of claim 1, wherein an indication of the set of resources is based on a sidelink resource index.

5. The method of claim 4, wherein the sidelink resource index is arranged from a frequency direction and a time direction.

6. The method of claim 1, further comprising receiving, from the second UE, a set of resource timing slots in which the first UE performs or does not perform the sidelink transmission.

7. The method of claim 6, wherein the set of resource timing slots is represented using a bitmap or slot index within a new radio (NR) radio frame.

8. A first user equipment (UE), comprising:

a memory;

a transceiver; and a processor coupled to the memory and the transceiver;

wherein the processor is configured to perform:

triggering a second UE to provide a set of resources by sending, to the second UE, a UE assistance information;

receiving the set of resources from the second UE; and avoiding selecting one or more resources from the set of resources for sidelink transmission, wherein the processor is further configured to trigger the second UE to perform monitoring on a sidelink resource pool and exclude resources within a resource selection window, wherein the set of resources comprises a remaining candidate resource set from the second UE, wherein the UE assistance information comprises a resource selection window start and finish time.

9. The UE of claim 8, wherein the UE assistance information is sent periodically by the first UE, triggered upon sidelink data arrival from a UE upper layer, and/or triggered by the second UE.

10. The UE of claim 8, wherein a selection of the remaining candidate resource set at the second UE is based on transmission timing of the second UE and/or other UEs.

11. The UE of claim 8, wherein an indication of the set of resources is based on a sidelink resource index.

12. The UE of claim 11, wherein the sidelink resource index is arranged from a frequency direction and a time direction.

13. The UE of claim 8, wherein the processor is further configured to receive, from the second UE, a set of resource timing slots in which the first UE performs or does not perform the sidelink transmission.

14. A non-transitory machine-readable storage medium, comprising instructions stored on the non-transitory machine-readable storage medium, wherein when executed by a computer, the instructions cause the computer to perform:

triggering a second UE to provide a set of resources by sending, to the second UE, a UE assistance information;

receiving the set of resources from the second UE; and avoiding selecting one or more resources from the set of resources for sidelink transmission, wherein the computer is further configured to trigger the second UE to perform monitoring on a sidelink resource pool and exclude resources within a resource selection window, wherein the set of resources comprises a remaining candidate resource set from the second UE, wherein the UE assistance information comprises a resource selection window start and finish time.

* * * * *